(EXAMPLE XI)

(EXAMPLE IV)

(EXAMPLE VI)

INVENTOR.
FREDERICK W. STEFFGEN
BY
*Grant L. Hubbard*
ATTORNEY.

United States Patent Office 3,634,538
Patented Jan. 11, 1972

3,634,538
PROPORTIONATION OF OLEFINS
Frederick W. Steffgen, Laguna Beach, Calif., assignor to Atlantic Richfield Company, Philadelphia, Pa.
Continuation-in-part of application Ser. No. 537,270, Mar. 25, 1966. This application Apr. 1, 1969, Ser. No. 812,271
Int. Cl. C07c *3/62*
U.S. Cl. 260—683 D                    8 Claims

ABSTRACT OF THE DISCLOSURE

A process for producing intermediate molecular weight olefins from mixtures of higher and lower molecular weight olefins by proportionating a mixture of said higher and lower molecular weight olefins over a molybdenum oxide, tungsten oxide, or mixed molybdenum oxide-tungsten oxide catalyst at 150° C. to 220° C., recovering the product which includes a major constituent intermediate molecular weight olefins not present in the feed, separating the mixture to produce an intermediate molecular weight olefin product and a mixture of higher and lower molecular weight olefins which are recycled to the proportionation stage in mixture with additional higher and lower molecular weight olefins is disclosed. Carbon monoxide may be passed through the proportionation reactor with the mixed olefin feed stock.

CROSS REFERENCE TO RELATED APPLICATION

This is a continuation-in-part of my copending application Ser. No. 537,270, filed Mar. 25, 1966, now abandoned.

BACKGROUND OF THE INVENTION

Field of the invention

This invention is concerned with a method for producing olefins and, more particularly, to a method for producing one or more olefins having a predetermined chain length by "proportionation" of a mixture of linear olefins of greater and less molecular weight than the desired olefins. More specifically, this invention relates to the preferential formation of olefins of a molecular weight equal to or nearly equal to the overall average molecular weight of the olefins from which they are prepared. Molybdenum oxide, tungsten oxide and mixtures of these oxides which have been pretreated with a reducing agent are used as the catalysts. Carbon monoxide may be passed through the proportionation reaction zone with the mixture of linear olefins.

Description of the prior art

The disproportionation of olefins has been described by Chenicek, U.S. Pat. 2,614,137, has been described as a reaction in which polymers, prepared by a previous polymerization step, having molecular weights above and below the polymer desired are comingled and reacted at selected conditions in the presence of certain catalytic agents to effect an averaging of molecular weights of the polymers charged. It is proposed that the mechanism of this reaction is essentially a combination of substantially simultaneous reactions including hydrogen transfer, cracking and polymerization which yields a product containing hydrocarbon compounds varying in molecular weight over the entire range existing between the extremes in molecular weights of the polymers subjected to the reaction, and including saturated compounds formed by virtue of the hydrogen transfer reactions during the process. Monomeric olefins, up to 30 percent by weight of the polymers, are charged into the reactor to provide a component which will average with the low polymers, i.e., copolymerized therewith, to form a copolymer of the ultimately desired molecular weight. This highly complex reaction occurs at relatively high temperatures, preferably between 300° C. and 400° C., over silica-containing catalysts which are known to catalytically promote cracking, depolymerization, dehydrogenation, hydrogen transfer, etc.

Another type of reaction, also known as a disproportionation reaction, is described by Banks, U.S. Pat. 3,261,879 and by Sherk, U.S. Pat. 3,296,330. This disproportionation reaction, however, is approximately the converse of the previously disclosed proportionation reaction in that a single molecular weight olefin constitutes the feed to the process while a plurality of higher and lower molecular weight olefins comprises the effluent from the process. Similarly, a group of intermediate molecular weight olefins may constitute the feed to the Sherk process for thereby producing a spectrum of olefins including olefins with higher molecular weight and lower molecular weight than any olefins contained in the feed stock. This process, then, consists essentially of converting an olefin stream of narrow range intermediate molecular weight olefins to an olefin stream of broad range higher and lower molecular weight olefins. The Sherk and Banks processes are carried out over a cobalt oxide-molybdenum oxide catalyst supported on alumina. The catalyst is pretreated with an oxidizing agent and mild pretreatment with a reducing agent such as carbon monoxide or hydrogen can be tolerated, although such pretreatment reduces the disproportionation activity of the catalyst.

As will be pointed out more specifically hereinafter, my invention is distinguished from the prior art inventions in that by proportionation I mean a reaction which converts linear olefins into all possible carbon numbers of $C_nH_{2n}$ linear olefins without changing the total number of molecules present in the reaction mixture. At equilibrium, the reaction mixture has a unimodal distribution of molar concentrations versus molecular weight with a maximum molar concentration at or near the average molecular weight of the feed mixture. In the proportionation reaction olefins having carbon numbers higher and lower than the feed average decline. All possible linear $C_nH_{2n}$ isomers are found but no carbon-carbon chain branching is produced during the proportionation reaction. It is, accordingly, a principal object of my invention to provide a method for producing intermediate molecular weight olefins in high yield from a mixture of higher and lower molecular weight olefins by proportionation.

SUMMARY OF THE INVENTION

In the present invention, a mixture of olefins is prepared from olefins of a higher molecular weight and olefins of a lower molecular weight, with little or no olefin content in a molecular weight intermediate said higher and lower molecular weights. The mixture may desirably contain carbon monoxide to maintain the catalyst activity. The mixture, with or without carbon monoxide, is then contacted at from about 150° C. to about 220° C. with a catalyst which consists essentially of molybdenum oxide, tungsten oxide, or mixtures of these oxides, supported on a non-cracking support, alumina being the preferred support. This catalyst is pretreated with a reducing agent such as carbon monoxide or hydrogen to maximize proportionation efficiency. A mixture of olefins is recovered from the contacting step which includes, in addition to the higher and lower molecular weight olefins, intermediate molecular weight olefins which, depending upon the nature of the feed stocks, etc. preferably comprises a major portion of the recovered mixture. By major portion, I mean that either the total of the intermediate olefins, in mole percent, exceeds the total of olefins in either the higher molecular weight range or the lower molecular weight range, or the mole percent of the intermediate olefin produced in maximum yield exceeds the mole percent of any other single molecular weight olefin, in the preferred operating embodiment. The intermediate molecular weight olefins are removed as the desired product and the higher and lower molecular weight olefins are mixed with additional feed to produce the desired ratio and recycled to the proportionation zone. A principal object of the invention, then, is to provide a proportionation process for producing intermediate molecular weight olefins from a mixture of higher and lower molecular weight olefins.

A more specific object of the invention is to provide a proportionation reaction in which a mixture of higher and lower molecular weight olefins and carbon monoxide are proportionated over a molybdenum oxide, tungsten oxide, or a mixed oxide, catalyst to produce a major portion of olefins having an average molecular weight intermediate the higher and lower molecular weight olefins.

Another specific object of the invention is to provide a proportionation process for preparing an intermediate molecular weight olefin from a mixture of higher and lower molecular weight olefins, said intermediate molecular weight olefins being present in the highest molecular yield.

As will be apparent from the specification which follows, these are exemplary of the objects of this invention and are not limiting thereof.

DESCRIPTION OF THE PREFERRED EMBODIMENTS

Figure 1:
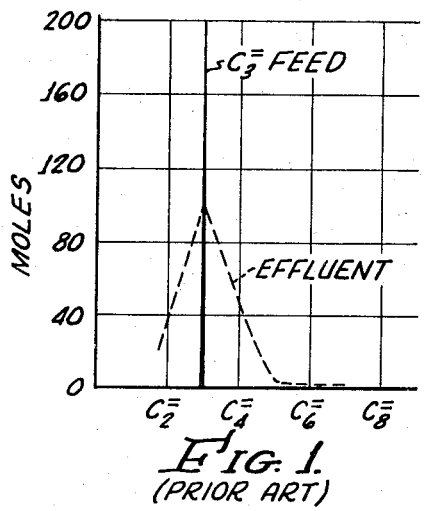
FIGS. 1 and 2 of the drawing illustrate the relative molar concentrations of the feeds and effluents of the most closely related prior art process of which I am aware.

The present invention provides a means by which a variety of linear olefins can be converted into more useful or valuable linear homologs. For example, waste olefins produced in refining or other processes as excess material can be converted into olefins of greater economic value. Refining processes produce olefins such as ethylene and propylene in large volume, and there is a constant need to find profitable uses for these materials. There are also a number of higher olefins, i.e., in the $C_{14}$ and above range, produced in wax cracking and like processes which generally have low commercial value. Using the process of this invention, it is possible to combine a wax cracking operation in which olefins with little value are combined with such olefins as ethylene, propylene and butene to produce olefins having an intermediate number of carbon atoms which are of greater commercial worth. For example, olefins having a relatively high chain length can be combined with those of a lower chain length to produce olefins in the range useful for preparation of detergent alkylates, that is, in the $C_{10}$–$C_{16}$ range. For example, a linear $C_{23}H_{46}$ olefin and ethylene can be proportionated to produce linear $C_{12}H_{24}$ olefins which are valuable in detergent alkylate production. Those materials recovered from the proportionation reaction effluent which fall outside of the desired molecular weight range can be recycled with more of the mixed feed reactant olefins having the appropriate size to produce more useful olefins after proportionation. The straight chain olefins produced by the process of this invention can be used in producing oxo-products such as aldehydes and alcohols wherein straight chain olefins of a given molecular weight are often needed as starting materials. Olefins available in cracked gasoline can be extracted from the gasoline and proportionated with lighter olefins or heavier olefins from another source to produce olefins falling within a more useful average molecular weight range. Also, cracked gasoline itself could be passed over the catalyst of this invention in the presence of a lighter or a heavier olefin feed to produce olefins having a more desirable molecular weight for use as chemical raw materials.

In carrying out the process of the present invention, linear feed olefins having a discontinuous molecular weight distribution, i.e., having unequal molecular weights, are proportionated, that is, olefins having a molecular weight equivalent to the average molecular weight of the feed olefins are produced, by passing the feed olefins into contact with a transition metal oxide catalyst which has been pretreated with a reducing agent. The metal component of the transition metal oxide should be molybdenum or tungsten. The metal oxide, afer treatment with the reducing agent, exists in either the oxide or carbonyl form or a mixture of the two. The pretreatment of the metal oxide is performed by heating it in the presence of a reducing agent, preferably carbon monoxide. The pretreatment of the metal oxide catalyst should be performed at temperatures above about 200° C. and preferably at temperatures of from about 400° C. to about 600° C. It is theorized that a semi-carbonyl-type compound, perhaps a dicarbonyl, is formed in the carbon monoxide pretreatment. In any event, the metal oxide is at least partially reduced during the pretreatment.

The catalyst of the present invention can be best used if placed on a non-cracking support material such as alumina or silica. Use of a cracking support, such as silica-alumina combined, leads to complex side reactions. The weight percent of metal oxide to support material may vary over a wide range but it is more practical to use it in amounts of 1 to 40 percent by weight of the support material. After the catalyst has been properly prepared, feed olefins having a discontinuous molecular weight distribution are passed thereover at a temperature of 150° C. to 220° C. The resulting reaction produces a mixture of olefins, at least a portion of which are olefins having a molecular weight equal to the average molecular weight of the mixed olefinic starting materials. The preferred catalysts for the present invention consist essentially of carbon monoxide pretreated molybdenum trioxide, tungsten trioxide and mixtures of tungsten oxide and/or molybdenum oxide with other transition metal oxides such as cobalt oxide.

The proportionation catalyst tends to deactivate with time but its life appears to be extended by conducting the proportionation reaction in the presence of the reducing gas used in the pretreatment of the catalyst, i.e., carbon monoxide. When the catalyst activity has deteriorated beyond a desirable limit, it can be regenerated by heating in the presence of an oxygen-containing gas to burn off deposits and then again pretreated with the reducing agent, preferably carbon monoxide, in the manner described above.

The catalyst of this invention may be prepared by first preparing a solution containing the metal component of the catalyst, i.e., in the case of molybdenum oxide an ammonium molybdate solution may be used. The support material is impregnated with the transition metal catalyst compound containing solution and then dried at an elevated temperature (about 400° C. or greater) to implant the metal in its oxide form upon the support material. The metal oxide and support material are then heated in the presence of carbon monoxide at temperatures of at least 200° C. and preferably 400° C. or higher, and then cooled. The carbon monoxide pretreatment of the metal oxide catalyst probably converts at least part of the metal oxide to a carbonyl derivative, possibly an oxycarbonyl or carbonyl itself. The carbon monoxide pretreatment is conducted at temperatures at which metal hexacarbonyls are unstable, and thus it is known that the catalyst does no take the form of a hexacarbonyl as might otherwise be expected. The carbon monoxide pretreatment apparently provides a stable carbonyl intermediate. The effect carbon monoxide pretreatment has upon the metal oxides is not fully understood. Alumina in its activated form has provided to be the most suitable support material for the metal oxide catalyst of this invention. Other high surface area support materials such as silica can be used, however.

The instant proportionation reaction proceeds more efficiently in the vapor phase; however, reaction in the vapor phase is not essential as liquid phase proportionation can also be accomplished.

Because the proportionation reaction is reversible, it is desirable to have sufficient contact time between the olefins and the catalyst to allow equilibrium conditions to be established or approximate equilibrium conditions. When equilibrium conditions are reached, the product distribution resulting from the present process approximates a unimodal curve having somewhat higher molar concentrations in the region of the average molecular weight.

As suggested earlier, the olefins suitable for use are linear olefins and include olefins having chain lengths of from $C_2$ up to at least $C_{25}$, however, in theory there is no limitation on the size of the olefins which may be used. Tests indicate that the location of the double bond does not restrict the activity of the olefin since the double bond is quickly isomerized to other positions in the molecule over the catalysts used for proportionation.

The following examples are provided to illustrate further the nature of this invention and how it can be practiced, however, it should be understood that the invention is not restricted to these examples.

EXAMPLE I

A molybdenum trioxide-on-alumina catalyst was prepared by impregnating 50 gms. of tabular alumina sold under the trade name Harshaw AL 1404 with an aqueous impregnating solution containing 20 milliliters of deionized water and 6 gms. of ammonium molybdate. The ammonium molybdate impregnated alumina was dried with mixing and stirring to assure that all liquid would be absorbed on the alumina. The drying was effected at 100° C. until the material appeared thoroughly dry. It was then put in a muffle furnace and dried 15 min. at 200° C. after which the furnace was reset to 500° C. and heated for about 16 hours at this temperature. The catalyst was purged with nitrogen to remove adsorbed oxygen. The molybdenum oxide-on-alumina was then treated with carbon monoxide for about 3 hours at a temperature of 550° C. with carbon monoxide being passed into contact with the catalyst at the rate of 6 liters of carbon monoxide per hour. Effluent from the catalyst bed was passed through a U-tube containing Ascarite and it was determined that carbon doxide is released during the carbon monoxide pretreatment which indicates that the carbon monoixed acts as a reducing agent. After the carbon monoxide pretreatment was completed, the catalyst was cooled in the presence of carbon monoxide.

EXAMPLE II

A catalyst was prepared in the same manner as described in Example I except that 5.85 gms. of ammonium meta-tungstate instead of ammonium molybdate was used with 20 milliliters of deionized water. In both Examples I and II, after calcination in air, a catalyst was obtained having approximately 10 weight percent of molybdenum trioxide and tungsten trioxide, respectively.

EXAMPLE III

A 40 ml. volume of catalyst comprising 3.5 weight percent cobalt oxide and 12.5 weight percent molybdenum trioxide-on-alumina was pre-carbon monoxide treated in the manner described in Example I except the carbon monoxide pretreatment was performed for about ½ hour in a reaction chamber. A mixture of 0.6 liter per hour of carbon monoxide, 3.0 liters per hour of ethylene, and 3.0 liters per hour of butene-1 was passed over the catalyst at atmospheric pressure at times and temperatures as indicated in Table 1 below. The effluent was recovered and analyzed at various times during the reaction with the results being shown under "GC Analysis" in Table 1.

TABLE 1

|  | A | B | C |
|---|---|---|---|
| Accumulated on stream time, hr.:min | 0:30 | 1:40 | 2:25 |
| Temp., °C | 151 | 205 | 253 |
| GC analysis (CO-free basis) mole percent | | | |
| $C_2H_4$ | 23.0 | 24.1 | 31.7 |
| $C_3H_6$ | 50.5 | 41.8 | 33.2 |
| $C_4H_8$-1 | 4.6 | 4.5 | 5.3 |
| Cis $C_4H_8$-2 | 12.6 | 16.1 | 16.5 |
| Trans $C_4H_8$-2 | 6.5 | 8.6 | 9.7 |
| $C_5H_{10}$+ | 2.8 | [1] 4.9 | 3.6 |

[1] Consisted of 0.4% $C_5H_{10}$-1 and 3.6% $C_5H_{10}$-2.

The results of these tests show that during time period "A" 50 mole percent propylene was produced from the ethylene-butene feed stream, but that as time passed the percentage conversion decreased gradually, indicating some deactivation of the catalyst.

EXAMPLE IV

An olefin feed containing molar proportions of 60% ethylene, 20% hexene-1 and 20% octene-1 was passed over 40 mls. (39.1 gms.) of a catalyst prepared in the manner described in Example I with the effluent having the composition shown in Table 2.

EXAMPLE V

An olefin feed comprising 50 mole percent ethylene and 50 mole percent butene-1 was passed over 40 mls. (14.8 gms.) of a catalyst prepared in the same manner as described in Example I except silica was used as the support material instead of alumina. As the results shown in Table 2 indicate, silica does not appear to be as effective as a support as is alumina.

EXAMPLES VI AND VII

An olefin feed comprising molar ratios in one instance ⅔ ethylene and ⅓ octene-1 and in the second instance ⅓ ethylene and ⅔ octene-1 were passed into contact with 40 mls. (39.1 gms.) of the catalyst of Example I with results as shown in Table 2 being obtained. Equilibrium product composition was not established in VII as closely as in VI.

EXAMPLE VIII

A 10 weight percent cobalt oxide-on-alumina catalyst sold under the trade name Girdler T302 was heated in the presence of oxygen to about 500° C. and was pretreated with carbon monoxide in the same manner as described in Example I. Feed olefins comprising 50 mole percent ethylene and 50 mole percent butene were then passed over 40 mls. (46.2 gms.) of the catalyst. As the results shown in Table 2 indicate, no proportionation of the feed olefins was detected.

EXAMPLE IX

A 15 weight percent chromium sesquioxide $(Cr_2O_3)$-on-alumina catalyst was prepared from chromium trioxide and alumina with subsequent reduction. The catalyst was heated in air at 550° C. then carbon monoxide pretreated in the manner described in Example I. 40 mls. (41.1 gms.) of the resulting catalyst was then contacted with the same mixture of ethylene and butene (50:50 molar percent) being passed over the catalyst under substantially the same reaction conditions as were used in Examples III–VII. Again, as is shown in Table 2, no proportionation of the feed olefins was achieved.

EXAMPLE X

A molybdenum oxide-on-alumina catalyst was initially prepared in the manner described in Example I but was pretreated with hydrogen as a reducing agent instead of carbon monoxide. The hydrogen pretreatment was performed at about 550° C. for about 15 minutes. Water was produced during the pretreatment process indicating that reduction took place during the reaction. After the hydrogen pretreatment, the catalyst was cooled in the presence of hydrogen. 40 mls. (39.5 gms.) of the resulting catalyst was then used in the proportionation reaction in which 50 mole percent of ethylene and 50 mole percent of butene-1 were passed thereover. No carbon monoxide was used during the proportionation in this reaction. As the results shown in Table 2, indicate, some proportionation of the olefins was accomplished.

EXAMPLES XI AND XII

Molybdenum oxide-on-alumina (Example XI) and tungsten oxide-on-alumina (Example XII) catalysts, prepared in the manner described in Examples I and II, respectively, were used in proportionation reactions in which ethylene and butene-1 were used as the different feed olefins. The effectiveness of the catalyst was determined at different time intervals, as the results tabulated in Table 3 illustrate, and both the molybdenum and tungsten catalysts retain their activity over at least a 3 hour period.

The total feed in Example XI was 224.09 millimoles and the total product was 218.90 millimoles. Thus, 97.7 percent of the feed, in moles, was recovered in unmodified or proportionated form. Reference to Table 2 shows that in Example V 98.95 percent of the feed stock was recovered in unchanged or proportionated form and in Example VII 93.7 percent of the feed was recovered either unchanged or proportionated. This is extremely significant since it shows that the reaction is true proportionation reaction and not a cracking reaction, which would result in an increase in the number of moles in the effluent as compared with the feed and that it is not a polymerization reaction since this would result in a reduced molar quantity in the effluent. The consistency of results in this area, only some of which are reported, shows that this is not a combined polymerization-cracking reaction since an identity and the quantity of reduction from polymerization and of increase from cracking would be only coincidental and, therefore, not repeatable.

Without desiring to be bound by the following suggested explanation, it is postulated that the reaction involved, the proportionation reaction of this invention, comprises both isomerization and proportionation, the latter believed to constitute a substantially simultaneous reaction of two olefins of differing molecular weight with the catalyst followed by exchange of olefin molecule moieties between the two olefins and separation from the catalyst. Since the exact nature of the catalyst is not known, however, the reaction mechanism of the olefins with the catalyst is not completely understood.

As previously indicated, however, the present invention comprises more than simply the discovery of a unique reaction mechanism. Indeed, the present invention constitutes a particular sequence of operations involving the catalyst and utilizing the reaction mechanism, whether the mechanism is as proposed or not.

The specific steps of this invention are: first, preparing a feed mixture consisting essentially of higher molecular weight olefins and lower molecular weight olefins, with carbon monoxide if desired. Olefins in an intermediate range between the higher and lower molecular weights are effectively absent, i.e., are absent or substantially absent. Second, the mixture is reacted at the specified temperature with the catalyst, which has been preactivated, and, third, recovering a mixture of olefins which includes not only remnants of the higher and lower molecular weight olefins but a major portion of intermediate molecular weight olefins. The total molar quantities of the olefins in the mixture are substantially equal to the molar quantity of olefins in the feed. The term "major portion" as used herein means, depending upon the number of olefin species falling within the intermediate range, i.e., the width of the intermediate olefin range, and the relative molar quantities of the feed stocks, that either the molecular sum of all olefins in the intermediate range exceeds the molecular sum of the olefins in either the higher molecular weight range or the lower molecular weight range or, in the alternative, that the olefin species present

TABLE 2

| | Example |
|---|---|---|---|---|---|---|---|
| | IV | V | VI | VII | VIII | IX | X |
| Catalyst Composition | 10% MoO₃ 90% Al₂O₃ | 10% MoO₃ 90% Si₂O₂ | 10% MoO₃ 90% Al₂O₃ | 10% MoO₃ 90% Al₂O₃ | 10% Co₂O₃ 90% Al₂O₃ | 15% Cr₂O₃ 85% Al₂O₃ | 10% MoO₃ 90% Al₂O₃ |
| Pretreating, reducing agent | CO | CO | CO | CO | CO | CO | H₂ |
| Run temp., °C | 178 | 176 | 176 | 179 | 181 | 180 | 179 |
| Feed comp., mole percent: | | | | | | | |
| C₂H₄ | 60 | 50 | 66.7 | 33.3 | 50 | 50 | 50 |
| C₄H₈ | | 50 | | | 50 | 50 | 50 |
| C₆H₁₂ | 20 | | | | | | |
| C₈H₁₆ | 20 | | 33.3 | 66.7 | | | |
| Feed rate, moles/hr | 0.179 | 0.210 | 0.186 | 0.185 | 0.210 | 0.210 | 0.210 |
| Total feed, millimoles | | 224.09 | | 224.09 | | | |
| Total product, millimoles | | 221.74 | | 208.10 | | | |
| Product comp., mole percent: | | | | | | | |
| C₂H₄ | 24.3 | 48.8 | 18.3 | 17.2 | 46.5 | 50.0 | 39.4 |
| C₃H₆ | 26.6 | 3.1 | 33.7 | 12.3 | 0.0 | 0.0 | 2.8 |
| C₄H₈ | 22.0 | 46.4 | 24.5 | 9.5 | 53.5 | 50.0 | 57.1 |
| C₅H₁₀ | 12.9 | 0.9 | 11.0 | 6.3 | | | 0.5 |
| C₆H₁₂ | 7.5 | 0.8 | 6.3 | 8.6 | | | 0.3 |
| C₇H₁₄ | 3.7 | | 3.3 | 13.3 | | | 0.0 |
| C₈H₁₆ | 1.9 | | 1.8 | 17.0 | | | |
| C₉H₁₈+ | 1.1 | | 1.1 | 15.8 | | | |

TABLE 3

| | Example | | | | | | | |
|---|---|---|---|---|---|---|---|---|
| | XI | | | | XII | | | |
| Catalyst composition | 10% MoO₃–90% Al₂O₃ | | | | 10% WO₃–90% Al₂O₃ | | | |
| Catalyst, wt./vol | 39.1 g./40.0 ml | | | | 42.5 g./40.0 ml | | | |
| Run temp., °C | 178 | | | | 180 | | | |
| Feed composition | 50 mole percent ethylene, 50 mole percent butene-1 | | | | 50 mole percent ethylene, 50 mole percent butene-1 | | | |
| Feed rate, moles/hr | 0.21 | | | | 0.21 | | | |
| Time on stream,[a] hrs | 1 | 1-2 [b] | 2.5 | 3 | 1 | 1-2 [b] | 2 | 3 |
| Product composition in mole percent: | | | | | | | | |
| Ethylene | 19.6 | 19.4 | 19.9 | 20.7 | 18.1 | 18.6 | 20.2 | 18.5 |
| Propene | 58.7 | 59.5 | 58.1 | 58.1 | 56.6 | 56.8 | 55.9 | 58.1 |
| 1 and 2-butenes | 20.1 | 19.4 | 20.3 | 19.6 | 22.2 | 21.7 | 21.2 | 20.1 |
| 1 and 2-butenes | 1.5 | 1.5 | 1.6 | 1.5 | 2.5 | 2.3 | 2.1 | 1.9 |
| 1,2 and 3-hexenes | 0.1 | 0.2 | 0.1 | 0.1 | 0.6 | 0.7 | 0.6 | 0.4 |

[a] On stream catalyst age after pretreating with CO and cooling to run temperature.
[b] A composite gas sample was collected over a 1 hour period.

in the greatest quantity in the intermediate molecular weight range exceeds in molar concentration the quantity of any single molecular weight olefin in either the higher molecular weight range or the lower molecular weight range. This invention may be practiced in an equivalent but less efficient form by producing only a substantial quantity of intermediate molecular weight olefins by, for example, operating the reaction zone such that equilibrium is not closely approached and recycling very large quantities of the higher and lower molecular weight feed stock.

Figure 2:
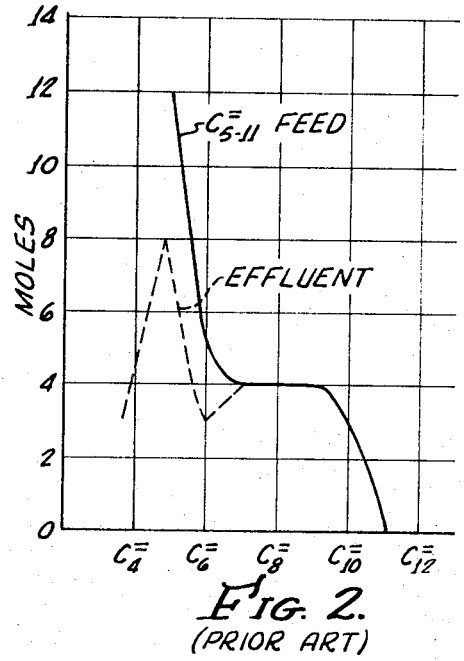

To better understand the present invention and to distinguish it from the inventions of the prior art, reference is made, first, to FIGS. 1 and 2 which illustrate the process described by Sherk in the aforementioned patent. In this prior art process, the feed initially comprised a single olefin, propylene. The effluent, on the other hand, included substantial quantities of $C_2$ and $C_4$ olefins, ethylene and butylene. Lesser amounts of pentene, hexene, and heptene were also produced.

In a second disproportion stage, the prior art teaches a feed consisting of a major portion of $C_5$ olefin, significant portions of $C_6$, $C_7$, $C_8$, $C_9$, and $C_{10}$ olefins with a trace of $C_{11}$ olefin. Interestingly, about one-third of the $C_5$ olefin is converted to a $C_4$ olefin but the $C_7$–$C_{10}$ olefins remain unchanged and the $C_6$ olefin is actually decreased. The nature and purpose of this reaction is not clear except that it does produce a lower molecular weight olefin.

Figure 3:
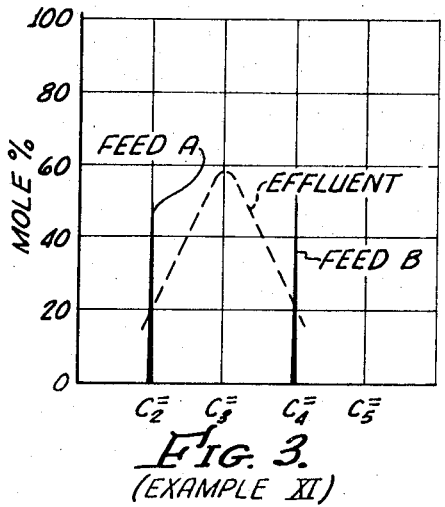
FIGS. 3, 4 and 5 represent the feed and effluent molar concentrations of three examples of the present proportionation process.

Contrary to the prior art, reference now being made to FIG. 3, my invention contemplates feeding a mixture of olefins, Feed A and Feed B in FIG. 3, of higher and lower molecular weight, $C_2$ and $C_4$ to a proportionation zone to produce an effluent of intermediate molecular weight, $C_3$, in which the olefin species of this intermediate molecular weight exceeds in quantity the effluent of the original feed olefin species. According to my invention, the intermediate molecular weight olefin is removed as the product and the higher and the lower molecular weight remnants of the feed in the effluent are recycled.

Figure 4:
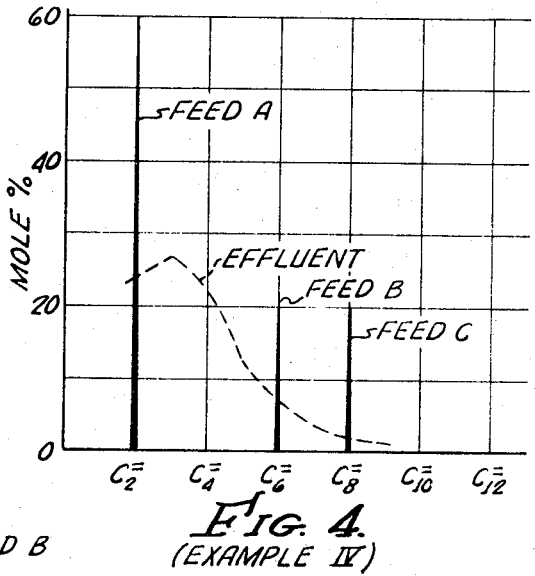

Similarly, in FIG. 4, a single lower molecular weight feed, $C_2$, Feed A, is mixed with higher molecular weight feeds, Feed B and Feed C, $C_6$ and $C_8$, to produce an effluent in which an intermediate molecular weight olefin, $C_3$, exceeds in quantity the molar amount of $C_2$, $C_6$, and $C_8$ remaining in the effluent mixture and in which the sum of the intermediate molecular weight olefins, $C_3$, $C_4$, and $C_5$, constitutes at least a substantial portion of the effluent and preferably a major portion thereof. The intermediate olefins are removed as the product and the remaining higher and lower molecular weight feed olefins are recycled.

Figure 5:
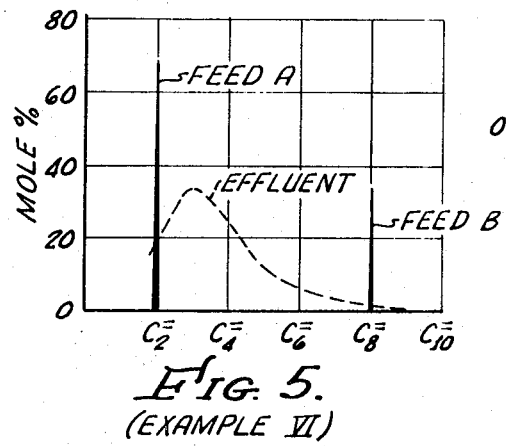

As previously pointed out, at equilibrium the reaction mixture has a unimodal distribution of molar concentrations versus molecular weight with the maximum molar concentration at or near the average molecular weight of the feed mixture. This is illustrated in FIG. 5 wherein it is desired to produce a $C_3$ olefin from a mixture of $C_2$ and $C_8$ olefins. An equal molar mixture of Feed A and Feed B, ethylene and octene would produce an effluent having a major proportion of $C_5$ olefin; however, as illustrated in FIG. 5, the distribution favors intermediate molecular weight olefins near the weighted average molecular weight of the feed mixture. It is possible, therefore, to shift the process to produce the desired intermediate molecular weight olefin by varying the relative molar inputs of the higher and lower molecular weight olefin feeds. In the present invention, the desired intermediate weight molecular olefin product is removed and the higher and lower molecular weight olefins remaining from the feed are recycled with makeup feed to produce the desired feed ratio. Carbon monoxide, if desired, may be added as previously indicated.

Obviously, many modifications and variations of the invention as hereinbefore set forth may be made without departing from the spirit and scope thereof, and therefore only such limitations should be imposed as are indicated in the appended claims.

I claim:

1. A proportionation process, in which a feed mixture of linear olefins of higher and lower molecular weights, intermediate molecular weight olefins being substantially absent, having a bimodal distribution of molar concentrations versus molecular weight is converted to a product mixture of linear olefins having a unimodal distribution of molar concentrations versus molecular weight with a maximum molar concentration near the average molecular weight of the feed mixture, for producing intermediate molecular weight olefins from higher and lower molecular weight olefins which comprises the steps of:

contacting said feed mixture consisting essentially of higher molecular weight olefins and lower molecular weight olefins, at a temperature of from about 150° C. to about 220° C. with a non-cracking catalyst consisting essentially of oxides of molybdenum, tungsten, mixtures thereof, or mixtures of said oxides with cobalt oxide, said catalyst having been pretreated with a reducing agent;

recovering an effluent mixture of olefins including at least a substantial portion of olefins of molecular weight intermediate the molecular weights of the olefins in the feed mixture, the total molar quantities of effluent olefins being substantially equal to the total molar quantities of feed olefins;

separating said effluent mixture into a product stream comprising the intermediate molecular weight olefins and into one or more recycle streams comprising higher and lower molecular weight olefins;

passing at least one recycle stream to the reaction zone, and recovering said intermediate molecular weight olefins as product.

2. The proportionation process defined in claim 1 wherein the catalyst is supported on alumina.

3. The proportionation process defined in claim 2 wherein the recycle stream comprises both higher and lower molecular weight olefins and is passed with added feed into contact with said catalyst.

4. The proportionation process of claim 3 wherein the intermediate molecular weight olefins comprise a major portion of the effluent olefin mixture.

5. The proportionation process of claim 4 wherein the feed mixture includes carbon monoxide.

6. The proportionation process of claim 4 comprising the further step of:

controlling the ratio of higher molecular weight olefins to lower molecular weight olefins in the feed mixture for thereby controlling the molecular weight of the intermediate molecular weight olefins produced therefrom.

7. The proportionation process of claim 1 wherein the source of higher molecular weight olefin feed is cracked gasoline.

8. The proportionation process of claim 7 wherein the lower molecular weight olefin feed is ethylene.

References Cited

UNITED STATES PATENTS

| | | | |
|---|---|---|---|
| 2,196,363 | 4/1940 | Robertson | 260—683 |
| 3,094,481 | 6/1963 | Butler et al. | 208—89 |
| 3,429,804 | 2/1969 | Sze et al. | 260—674 |
| 2,614,137 | 10/1952 | Chenicek | 260—683 |
| 3,261,879 | 7/1966 | Banks | 260—683 |
| 3,296,330 | 1/1967 | Sherk | 260—683 |
| 3,526,676 | 9/1970 | Turner et al. | 260—683 |

DELBERT E. GANTZ, Primary Examiner

C. E. SPRESSER, Jr., Assistant Examiner

U.S. Cl. X.R.

260—671 R